(12) United States Patent
Knepler (10) Patent No.: US 7,263,283 B2
(45) Date of Patent: Aug. 28, 2007

(54) ELECTRONIC THERMOSTAT FOR LIQUID HEATING APPARATUS

(75) Inventor: John T. Knepler, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 10/534,195

(22) PCT Filed: Nov. 7, 2003

(86) PCT No.: PCT/US03/35583

§ 371 (c)(1),
(2), (4) Date: May 6, 2005

(87) PCT Pub. No.: WO2004/045249

PCT Pub. Date: May 27, 2004

(65) Prior Publication Data

US 2005/0271372 A1    Dec. 8, 2005

Related U.S. Application Data (60) Provisional application No. 60/425,175, filed on Nov. 8, 2002.

(51) Int. Cl.
H05B 1/02 (2006.01)
(52) U.S. Cl. .............. 392/498; 392/318; 392/494
(58) Field of Classification Search .......... 392/498, 392/441–442, 448.14, 497; 398/448.16; 219/482, 488, 491
See application file for complete search history.

(56) References Cited

U.S. PATENT DOCUMENTS

| 3,581,062 A | 5/1971 | Aston |
| 3,754,118 A | 8/1973 | Booker |
| 4,853,519 A | 8/1989 | Tanaka et al. |
| 4,853,539 A | 8/1989 | Tanaka et al. |
| 5,392,380 A | 2/1995 | Tsai |
| 5,559,720 A * | 9/1996 | Tompkins et al. .......... 700/300 |
| 5,690,849 A * | 11/1997 | DeVilbiss et al. .......... 219/497 |
| 5,692,096 A | 11/1997 | Massey et al. |
| 6,130,990 A * | 10/2000 | Herrick et al. .............. 392/321 |
| 6,351,603 B2 * | 2/2002 | Waithe et al. .............. 392/474 |
| 6,539,173 B2 | 3/2003 | Chu |
| 6,634,279 B2 * | 10/2003 | D'Antonio et al. ........... 99/285 |
| 6,806,446 B1 * | 10/2004 | Neale ......................... 219/497 |
| 6,907,680 B2 * | 6/2005 | Mariotti ...................... 34/486 |
| 2003/0000939 A1 * | 1/2003 | Faries et al. ................ 219/497 |

FOREIGN PATENT DOCUMENTS

EP    648992 A1 *   4/1995

OTHER PUBLICATIONS

International Search Report, date of completion Mar. 17, 2004, for PCT/US2003/035583.

* cited by examiner

Primary Examiner—Philip H. Leung
Assistant Examiner—Vinod Patel
(74) Attorney, Agent, or Firm—Barnes & Thornburg LLP

(57) ABSTRACT

An electronic thermostat (20) has a mechanical switch (22) and a solid-state switch (24). The electronic thermostat (20) is suitable for use in a liquid heating apparatus, such as a coffee maker or any other apparatus that dispenses heated beverages. In an illustrative embodiment, the electronic thermostat (20) has a controller (36) and a temperature sensor (34).

18 Claims, 2 Drawing Sheets

MECHANICALLY SWITCHED THERMOSTAT
CHARACTERISTIC

PRECISE, NO DIFFERENTIAL CHARACTERISTIC

SYSTEM DIAGRAM
FIG. 3

ELECTRONIC THERMOSTAT FOR LIQUID HEATING APPARATUS

This application is a U.S. National Stage Application of International Application No. PCT/US03/35583 filed Nov. 7, 2003 and claims the benefit of U.S. Provisional Application No. 60/425,175 filed Nov. 8, 2002.

BACKGROUND

The present disclosure relates to a liquid heating apparatus, and particularly, to an electronic thermostat for a liquid heating apparatus. More particularly, the present disclosure relates to an electronic thermostat that is suitable for use in an apparatus that dispenses heated beverages.

A liquid heating device, such as a coffee maker, has a heater that heats liquid, such as water, contained in a container. Mechanical switches are included in some liquid heating devices and are opened and closed to control the application of electrical power to the heater. Other liquid heating devices have solid-state switches that are operable to control the application of electrical power to the heater. Conventional mechanical switches have metal contacts with sufficient mass to serve as heat sinks to dissipate power, in the form of heat, caused by current flowing through the contacts when the mechanical switches are closed. However, mechanical switches have moving parts that wear out over time after repeated cycles of opening and closing. Electrical arcing, which degrades the metal contacts, often occurs when mechanical switches are opened and closed. Solid-state switches, such as triacs, do not have moving parts and therefore have long lives. However, solid-state switches sometimes require rather large heat sinks in order to dissipate power to prevent the solid-state switches from overheating.

SUMMARY

According to the present disclosure, a thermostat having a mechanical switch and a solid-state switch is provided. The thermostat may be included in a liquid heating apparatus, such as an apparatus that dispenses heated beverages. Electrical power sometimes may be applied to a heater through the mechanical switch and sometimes may be applied to the heater through the solid state switch. Electrical power sometimes may be applied to the heater through both the mechanical switch and the solid state switch at the same time. A controller may be provided to control the operation of the mechanical switch and the solid-state switch. The thermostat may have a temperature sensor to sense the temperature of the liquid being heated. The temperature sensor may provide a signal to the controller indicative of the temperature of the liquid. When the liquid is to be heated by a large amount, the mechanical switch may be closed for a relatively long period of time to apply continuous power to the heater during the time period. When the liquid is within a tolerance range of its target temperature, the solid-state switch may be operated to apply brief pulses of power to the heater to maintain the liquid at substantially the target temperature. Just prior to the mechanical switch being opened and/or closed, the solid-state switch may be turned on to prevent arcing between contacts of the mechanical switch. Whenever the mechanical switch is closed, the solid-state switch may be turned on as well. The mechanical switch may be a relay. The solid-state switch may be a triac.

In some embodiments, an electronic thermostat is provided for use with a liquid heating apparatus having a container in which liquid is contained and a heater that is operable by electrical power to heat the liquid. In such embodiments, the electronic thermostat comprises a mechanical switch and a solid-state switch. Electrical power is applied to the heater through the mechanical switch to increase heat generated by the heater from an initial amount toward a target amount. Electrical power is applied to the heater through the solid-state switch to maintain the heat generated by the heater at substantially the target amount.

In an illustrative embodiment, a temperature sensor is provided and is configured to sense the temperature of the liquid in the container. Also in the illustrative embodiment, a controller is provided to receive a signal from the temperature sensor. The controller selectively controls the operation of the mechanical switch and the solid-state switch in response to the signal from the temperature sensor. In one embodiment, the controller implements a proportional-integral-derivative algorithm to control the temperature of the liquid. According to one aspect of this disclosure, liquid heating devices originally constructed without electronic thermostats having both mechanical switches and solid-state switches may be upgraded to include such electronic thermostats.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures, in which.

DETAILED DESCRIPTION

Some prior art liquid heating devices have mechanical switches, such as relays, that are closed to apply power from a supply voltage to a heater. Such mechanical switches have metal contacts, at least one of which is movable between an opened position, in which the contacts are spaced apart so that no current can flow through the switch, and a closed position, in which the contacts touch so that current is able to flow through the switch. After repeated cycles of opening and closing, mechanical switches eventually wear out. In addition, electrical arcing oftentimes occurs between the metal contacts during opening and closing of the switch, usually when the contacts are in close proximity just before making contact or just after separating when breaking contact.

Figure 1:
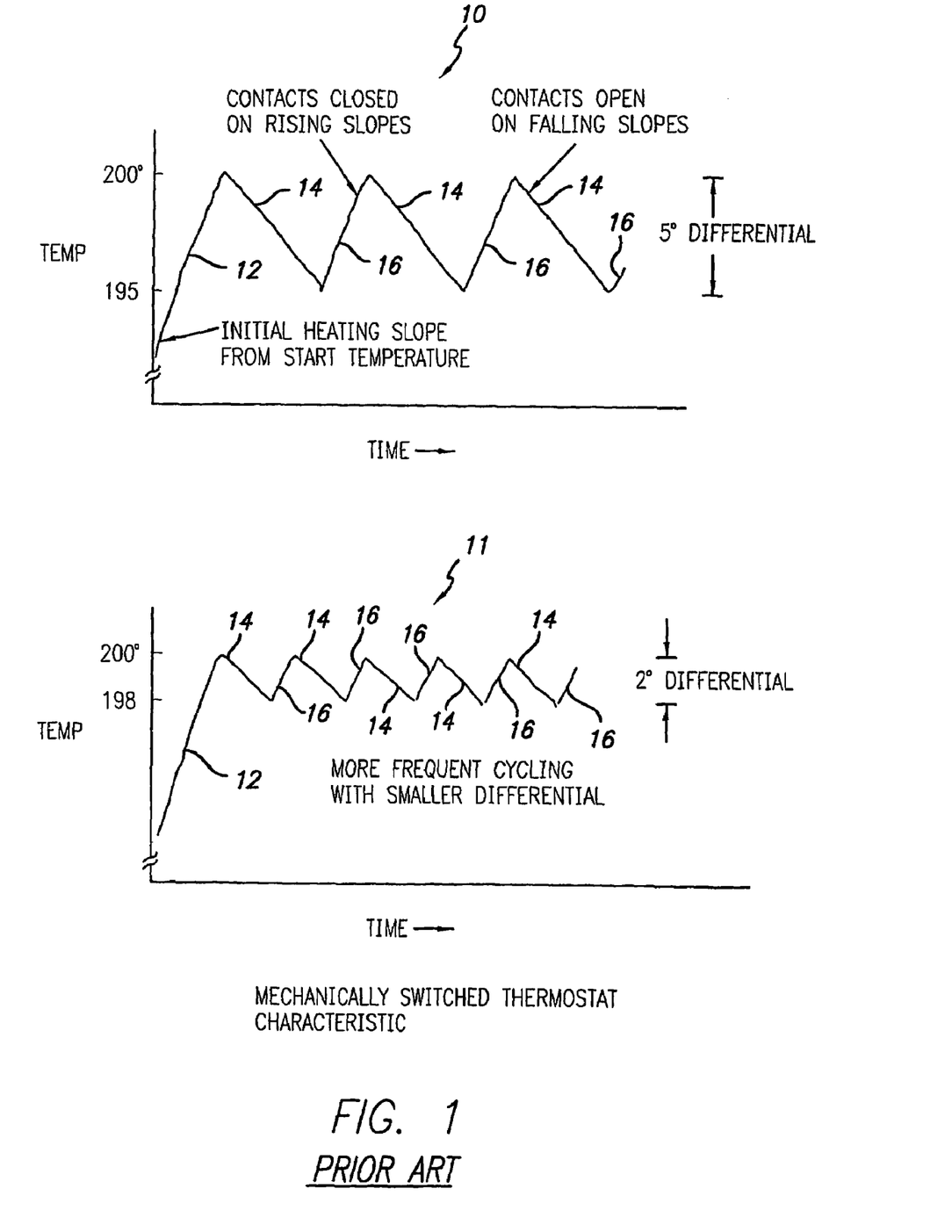
FIG. 1 is a pair of graphical representations showing time-versus-temperature of liquid heated by prior art liquid heating devices that use a mechanical switch to control the application of electrical power to a heater, one of the graphs depicting temperature variation within a five degree tolerance range after initial heating and the other of the graphs depicting temperature variation within a two degree tolerance range after initial heating.

Referring now to FIG. 1, a first graph 10 and a second graph 11 each show temperature versus time of a liquid heated by a prior art liquid heating device that uses a mechanical switch to control the application of electrical power to a heater. When the mechanical switch is closed, power from a power supply is applied to the heater of the liquid heating device to increase the temperature of the liquid. Thus, during an initial heating phase, indicated by a line segment 12 having a positive slope, the mechanical switch is closed so that liquid temperature increases from an initial value to a desired or target temperature, such as for example, 200 degrees Fahrenheit. When the liquid reaches the target temperature, the mechanical switch is opened and the temperature of the liquid decreases until a temperature at the low end of a tolerance range is reached, at which point the mechanical switch closes so that power is, once again, applied to the heater. To maintain the liquid at a temperature within the tolerance range between a maximum value and a minimum value, the mechanical switch is closed and opened cyclically.

Line segments 14 having falling or negative slopes in FIG. 1 indicate the time periods that the mechanical switch is opened during liquid temperature maintenance. Line segments 16 having rising or positive slopes in FIG. 1 indicate the time periods that the mechanical switch is closed during liquid temperature maintenance. In the upper graph 10 of FIG. 1, the associated prior art liquid heating device has a five degree Fahrenheit tolerance range between a maximum value of 200 degrees Fahrenheit and a minimum value of 195 degrees Fahrenheit. In the lower graph 11 of FIG. 1, the prior art liquid heating device has a two degree Fahrenheit tolerance range between a maximum value of 200 degrees Fahrenheit and minimum value of 198 degrees Fahrenheit.

It is readily apparent from a comparison of graph 10 to graph 11 that the frequency at which the mechanical switch is opened and closed is greater when the liquid temperature tolerance range is smaller. It should be appreciated that, although line segments 12, 14, 16 in graphs 10, 11 are shown as straight line segments for the sake of simplicity, liquid heating devices may not produce straight line heating and cooling characteristics in the associated liquid due to various factors such as geometry of the container containing the liquid, the material from which the container is made, the geometry of the heater heating the liquid, and the type of liquid being heated.

Figure 3:
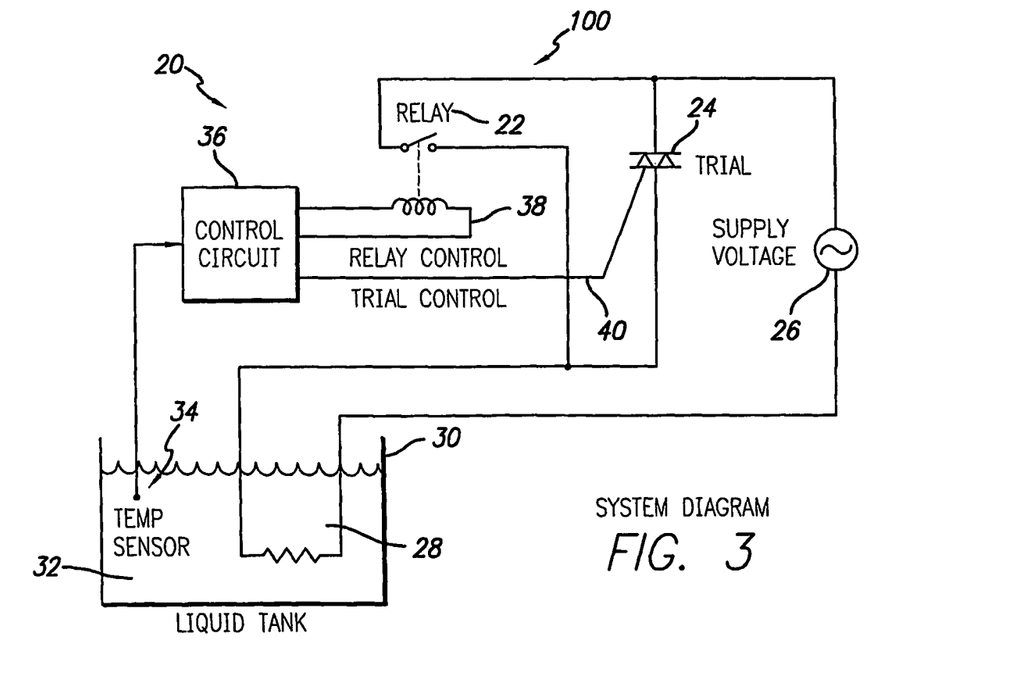
FIG. 3 is a diagrammatic view showing a water tank, a heater for heating water contained in the water tank, a temperature sensor for sensing a temperature of the water, a control circuit coupled to the temperature sensor, a relay coupled to the control circuit and to a supply voltage, a triac coupled to the control circuit and to the supply voltage, and the supply voltage being coupled to the heater through the relay and through the triac.

According to the present disclosure, an electronic thermostat 20 has a mechanical switch 22 and a solid-state switch 24 as shown in FIG. 3. Illustrative mechanical switch 22 and solid state switch 24 comprises a triac. Switches 22, 24 are arranged in a parallel configuration and are coupled to a series combination of a power supply 26 and a temperature modifier such as a heater 28. Power supply 26 may be, for example, standard 120 Volt A.C. power that is accessible from a power outlet. Temperature modifier 28 may comprise, for example, a heating element of a liquid heating device. The temperature modifier 28 may also be, for example, a cooling element to reduce the temperature of a liquid in which it is placed. The electronic thermostat 20 is used with the liquid temperature modifying apparatus. The liquid temperature modifying apparatus may be a device for brewing or otherwise producing heated beverages as well as producing cooled or chilled beverages. In either form of apparatus there is a container in which liquid is contained in a temperature modifier such as a heater of cooling element that is operable by electric power to at least one of heat or cool the liquid.

Switch 22 is movable between an opened position and a closed position. When switch 22 is in the closed position, power from power supply 26 is applied to heater 28 through switch 22. That is, when switch 22 is in the closed position, an electric potential or voltage of the power supply is coupled to heater 28 through switch 22 so that current flows through the heater 28 causing heater 28 to heat up. Switch 24 is operable in an open-circuit mode of operation and is also operable in a closed-circuit mode of operation. Switch 24 is considered to be turned off when operating in the opened-circuit mode and switch 24 is considered to be turned on when operating in the closed-circuit mode of operation. When switch 24 is turned on, power from power supply 26 is applied to heater 28 through switch 24. When switch 22 is in the opened position and switch 24 is turned off, heater 28 is decoupled from power supply 26.

In the illustrative example, thermostat 20 is included in a liquid heating apparatus 100, such as a coffee maker or other heated beverage dispenser, as shown in FIG. 3. Apparatus 100 has a container 30 for containing a liquid 32, such as water, that is to be heated by heater 28. In some embodiments of apparatus 100, heater 100 is situated inside container 30 and is, therefore, submerged in whole or in part in liquid 32. In other embodiments, heater 100 is coupled to container 30 and heats liquid 32 through container 30 and any other structures situated between heater 28 and liquid 32. In still other embodiments, heater 28 is in close proximity to container 30, but is not otherwise coupled thereto, and heats liquid 32 through container 30 and any other structures situated between heater 28 and liquid 32. In some embodiments, container 30 is removable from apparatus 100 so that heated liquid 32 may be poured into another receptacle, such as a coffee cup. In other embodiments, heated liquid 32 is routed from container 30 to an outlet spigot or to another portion of apparatus 100 for further processing.

Illustrative thermostat 20 has a temperature sensor 34 and a controller or control circuit 36 as shown in FIG. 3. Temperature sensor 34 sends a signal to controller 36 that is indicative of the temperature of liquid 32. In alternative embodiments, sensor 34 sends a signal to controller 34 that is indicative of a temperature of temperature modifier or heater 28 or of container 30 or of some other associated structure, which signal is able to be correlated by controller 36 to the temperature of liquid 32. In some embodiments, controller 36 comprises various types of circuitry, such as signal conditioning circuitry, analog-to-digital conversion circuitry, processor circuitry, input/output circuitry, power regulation circuitry, and the like. Controller 36 has a processor, such as a microprocessor, microcontroller, programmable logic controller, discrete logic gates, or the like that receives the signal from sensor 34, either directly or after signal conditioning and/or A-to-D conversion, and that determines the manner in which switches 22, 24 should be operated to apply power from source 26 to heater 28.

When the signal from sensor 34 indicates that the temperature of liquid 32 is more than a threshold amount away from a target temperature, controller 36 sends a first control signal on a first control line 38 that is coupled to a coil of switch 22, thereby moving the contacts of switch 22 together to place switch 22 in the closed position. When the signal from sensor 34 indicates that the temperature of liquid 32 is substantially at the target temperature, controller 36 sends a second control signal on a second control line 40 that operates switch 24 in a manner that maintains the temperature of liquid 32 substantially at the target temperature. In the illustrative embodiment, the second signal turns switch 24 on and off cyclically to provide pulses of power from supply 26 to heater 28.

Controller 36 sends a signal on line 38 to move switch 22 to the closed position when liquid 32 is to be heated by a large amount, such as during initial heating of liquid 32 from an initial temperature toward a target temperature. During this initial heating phase, switch 22 may be closed for a relatively long period of time to apply continuous power to heater 28 during this relatively long time period. When liquid 32 is substantially at the target temperature or within a preset tolerance range of the target temperature, switch 22 may be operated to apply brief pulses of power to heater 28 to maintain liquid 32 at substantially the target temperature.

Figure 2:
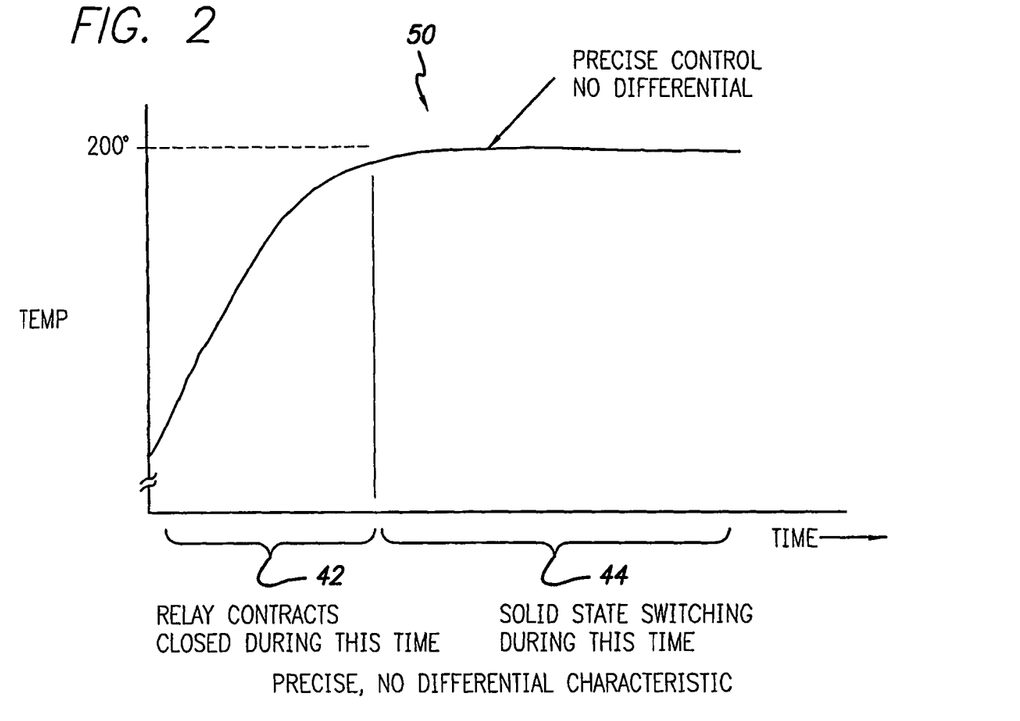
FIG. 2 is a graphical representation showing time-versus-temperature of liquid heated by a liquid heating device in accordance with the present disclosure in which a mechanical switch is used during initial heating of a liquid to apply electrical power to a heater and in which a solid-state switch is used after the initial heating to apply electrical power to the heater to maintain the temperature of the liquid substantially at a target temperature.

A graph 50, shown in FIG. 2, is exemplary of the temperature-versus-time characteristics of liquid 32 being heated in the above-described manner in which switch 22 is closed during an initial heating phase, corresponding to a first region 42 of graph 50, and in which switch 24 is turned on in pulses during a temperature maintenance phase, corresponding a second region 44 of graph 50. During the illustrative maintenance phase, the temperature of liquid 32 is maintained substantially at an illustrative target temperature of 200 degrees Fahrenheit. In alternative embodiments, switch 24 is turned on substantially at all times that the switch 22 is closed. In such alternative embodiments, during the initial heating phase corresponding to region 42 in graph 50 power is applied to heater 28 through both switches 22, 24.

Controller 36 may be programmed to implement any suitable control algorithm for maintaining liquid 32 at a desired temperature. Thus, controller 36 may be programmed to implement a partial or complete proportional-integral-derivative (PID) control algorithm. During implementation of the control algorithm, controller 36 adjusts the duty cycle of switch 24 (i.e., the percentage ratio of the time that switch 24 is turned on to the time that switch 24 is turned off), as necessary, to maintain the temperature of liquid 32. It will be appreciated that as the volume of liquid 32 in container 30 changes, due to the addition or removal of liquid 32, the duty cycle of switch 24 may need to be adjusted by controller 36. Other factors, such as the temperature of the ambient surroundings, may affect the duty cycle of switch 24 needed to maintain the temperature of liquid 32 substantially at the target temperature.

In some embodiments, controller 36 sends a signal on line 40 to turn on switch 24 just before signaling switch 22 on line 38 to change state between the opened and closed positions. Turning on switch 24 just prior to switch 22 changing states prevents arcing between the contacts of switch 22 because switch 24 carries the current during state changes of switch 22, thereby preventing deterioration of the contacts. In other embodiments, controller 36 sends a signal on line 40 to turn on switch 24 simultaneously or substantially simultaneously with sending a signal on line 38 to move switch 22 from the opened position to the closed position such that switch 24 is turned on substantially at all times that switch 22 is closed.

In one embodiment, heater 28 is operated at a load current of 20 Amps, switch 22 comprises a relay having ohmic contact resistance of about one milliohm, and switch 24 comprises a triac having a voltage drop of about 1.5 Volts. In this embodiment, therefore, when switch 22 is in the closed position, the amount of power to be dissipated ($i^2 \times R$) is 0.4 Watts, which is easily dissipated in the contacts of switch 22. For most, if not all, of the time that switch 22 is in the closed position, switch 24 is turned off, and therefore, switch 24 needs to dissipate no power, or only a negligible amount of power in those embodiments in which switch 24 is turned on for a brief moment just before switch 22 changes states.

It has been found that a realistic duty cycle to maintain the temperature in a static water tank or container such as a beverage server holding a volume of liquid that is typical of coffee makers, for example, is in the range of about one to about four percent. Thus, the average power ($i \times v \times duty$ cycle) that needs to be dissipated by the triac having a 1.5 Volt drop when operated at a duty cycle of about one to about four percent is about 0.3 Watts to about 1.2 Watts. In such embodiments, a small heat sink coupled to switch 24 is all that is needed to dissipate such power amounts. In other embodiments, no heat sink may be necessary. Due to the size reduction or elimination of the heat sink needed for switch 24, thermostat 20 may be packaged in a small enough physical space to permit retrofitting of thermostat 20 into older liquid heating devices that, prior to the retrofitting, had only mechanical switching devices. Thus, older machines may be upgraded with thermostat 20 to provide more reliable and precise temperature control.

When controller 36 determines that heater 28 needs to be energized for a relatively long period of time, switch 22 is closed and switch 24 is turned off so that it dissipates no power. This increases the life of switch 24 by preventing switch 24 from overheating. In those embodiments in which switch 24 is turned on whenever switch 22 is closed, most of the power is dissipated in switch 22 because the resistance of switch 22 is much lower than the resistance of switch 24. When controller 36 determines that heater 28 needs to be energized by short pulses or bursts of power, switch 22 is opened and switch 24 is used to apply the short pulses of power to heater 28. This increases the life of switch 22 by reducing the number of cycles of opening and closing switch 22. Thus, in some embodiments, switches 22,24 are used at different times to provide power to heater 28; in other embodiments, switch 24 may be turned on briefly before switch 22 changes states to prevent arcing in switch 22; and, in still other embodiments, switch 24 is turned on substantially at all times that switch 22 is closed. Embodiments in which switch 24 is turned on for other durations or percentages of time that switch 22 is closed are also contemplated by this disclosure, as are embodiments where pulses of power are sometimes generated by operation of switch 22 intermittently with the operation of switch 24.

As described above, illustrative mechanical switch 22 comprises a relay and illustrative solid-state switch 24 comprises a triac. It is within the scope of this disclosure for all types of mechanical switches, not just relays, and for all types of solid-state switches, not just triacs, to be included in electronic thermostat 20.

In addition, although illustrative thermostat 20 has a temperature sensor 34 that provides feedback to control circuit 36, other types of feedback may be provided to control circuit 36 in lieu of, or in addition to, the temperature signal from sensor 34. Such other types of feedback may be provided by one or more liquid level sensors that detect one or more levels of liquid 32 in container 30, one or more weight sensors that sense the weight of liquid 32 in container 30, one or more timers that indicate the length of time that switch 22 is closed and/or the length of time that switch 24 is turned on, and one or more proximity sensors that sense the presence and/or absence of container 30 in apparatus 100. Furthermore, control circuit 36 may be coupled to or otherwise integrated into other circuitry in apparatus 100 or may be a stand-alone circuit packaged with the other components of thermostat 20. In addition, control circuit 36 may be the main control circuit of apparatus 100 and, in such embodiments, circuit 36 may control the operation of other portions (not shown) of apparatus 100.

Terms including brewed, brewing, brewing substance, brewing liquid, beverage, and brewed beverage as used herein are intended to be broadly defined as including but not limited to the brewing of coffee, tea and any other brewed beverage. This broad interpretation is also intended to include, but is not limited to any process of dispensing, infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

Additionally, as set forth herein, this disclosure is intended to be broadly interpreted and applied to other electrical devices as well. For example, it is envisioned that the disclosed apparatus and method could be used with other cooking devices such as ovens and frying apparatus. The disclosed apparatus and method could also be used with cooling devices such as a Peltier device. Further it could be combined with a traditional cooling device which circulates a coolant to cool a substance. The disclosed apparatus and method could be used to add heat to such a cooling device to precisely control the "cooled" temperature. Additionally, the disclosed apparatus and method could be used with devices not used for cooking but which require temperature control such as hot tubs or spas.

Although the invention has been described in detail with reference to certain illustrative embodiments, variations and modifications exist with the scope and spirit of this disclosure as described and defined in the following claims.

The invention claimed is:

1. An electronic thermostat of a heated beverage dispenser having a container in which liquid is contained and a heater that is operable by electrical power to heat the liquid, the electronic thermostat comprising:
   a mechanical switch through which electrical power is applied to the heater to increase a temperature of the liquid from an initial temperature toward a target temperature;
   a solid-state switch in parallel with the mechanical switch through which electrical power is applied to the heater to maintain the temperature of the liquid at substantially the target temperature; and
   a controller, wherein the controller is programmed to implement a partial or complete proportional-integral-derivative algorithm for controllably heating liquid to produce a beverage, the controller being coupled to the mechanical switch and the solid-state switch.

2. The electronic thermostat of claim 1 further comprising a temperature sensor that senses the temperature of the liquid in the container and provides feedback to the controller.

3. The electronic thermostat of claim 1 further comprising a sensor that senses the level of the liquid in the container and provides feedback to the controller.

4. A method of heating a beverage dispenser, the method comprising:
   operating a mechanical switch to a closed circuit mode to apply power to a heater to heat the liquid from an initial temperature toward a target temperature, then opening the mechanical switch; and
   operating a solid-state switch to a closed circuit mode to apply power to the heater to maintain the liquid substantially at the target temperature;
   wherein the mechanical switch in parallel with the solid-state switch and are controlled by, and coupled to a controller and wherein the controller is programmed to implement a partial or complete proportional-integral-derivative algorithm for controllably heating liquid to produce a beverage.

5. The apparatus of claim 4 wherein the target temperature is approximately 200 degrees Fahrenheit.

6. The apparatus of claim 4 wherein the liquid is maintained at a temperature in the range of 180-210 degrees Fahrenheit.

7. A beverage brewing apparatus comprising, an electronic thermostat, a heated beverage dispenser having a container in which liquid is contained and a heater that is operable by electrical power to heat the liquid, the electronic thermostat comprising:
   a mechanical switch through which electrical power is applied to the heater to increase a temperature of the liquid from an initial temperature toward a target temperature;
   a solid-state switch in parallel with the mechanical switch through which electrical power is applied to the heater to maintain the temperature of the liquid at substantially the target temperature; and
   a controller, wherein the controller is programmed to implement a partial or complete proportional-integral-derivative algorithm for controllably heating a liquid to produce a beverage, the controller being coupled to the mechanical switch and the solid-state switch.

8. A method of heating a liquid in a heated beverage dispenser, the method comprising:
   operating a mechanical switch to apply power to a heater to heat the liquid from an initial temperature toward a target temperature;
   operating a solid-state switch in parallel with the mechanical switch to apply power to the heater to maintain the liquid substantially at the target temperature; and
   the mechanical switch and the solid-state switch being controlled by, and coupled to a controller, wherein the controller is programmed to implement a partial or complete proportional-integral-derivative algorithm for controllably heating liquid to produce a beverage.

9. An electronic thermostat kit in combination with a heated beverage dispenser having a container in which liquid is contained and a heater that is operable by electrical power to heat the liquid, the electronic thermostat kit comprising:
   a mechanical switch through which electrical power is applied to the heater to increase a temperature of the liquid from an initial temperature toward a target temperature;
   a solid-state switch in parallel with the mechanical switch through which electrical power is applied to the heater to maintain the temperature of the liquid at substantially the target temperature; and
   a controller, wherein the controller is programmed to implement a partial or complete proportional-integralderivative algorithm for controllably heating liquid to produce a beverage, the controller being coupled to the mechanical switch and the solid-state switch.

10. An electronic thermostat in combination with a heated beverage dispenser having a container in which liquid is contained and a temperature modifier that is operable by electrical power to at least one of heat or cool the liquid, the electronic thermostat comprising:

a mechanical switch through which electrical power is applied to the temperature modifier to change a temperature of the liquid from an initial temperature toward a target temperature;

a solid-switch in parallel with the mechanical switch through which electrical power is applied to the temperature modifier to maintain the temperature of the liquid at substantially the target temperature; and a controller, wherein the controller is programmed to implement a partial or complete proportional-integral-derivative algorithm for controllably heating liquid to produce a beverage, the controller being coupled to the mechanical switch and the solid-state switch.

11. A liquid beverage heating apparatus comprising;
a container for the liquid beverage;
a heater inside the container, the heater being operable by electrical power to heat the liquid in the container;
an electronic thermostat comprising:
a mechanical switch through which electrical power is applied to the heater to increase a temperature of the liquid from an initial temperature toward a target temperature;
a solid-state switch in parallel with the mechanical switch through which electrical power is applied to the heater to maintain the temperature of the liquid at substantially the target temperature; and
a controller, wherein the controller is programmed to implement a partial or complete proportional-integral-derivative algorithm for controllably heating liquid to produce a beverage, the controller being coupled to the mechanical switch and the solid-state switch.

12. The apparatus of claim 11, further comprising;
anti-arcing measuring device for closing the mechanical switch to prevent arcing between the contacts of the mechanical switch.

13. The apparatus of claim 12, wherein the anti-arcing measuring device includes means closing the solid-state switch briefly before applying electrical power to the heater by closing the mechanical switch.

14. The apparatus of claim 11, wherein the mechanical switch is of lower resistance than the solid-state switch.

15. The apparatus of claim 11 further comprising a temperature sensor that senses the temperature of the liquid in the container and provides feedback to the controller.

16. The electronic thermostat of claim 11 further comprising a sensor that senses the level of the liquid in the container and provides feedback to the controller.

17. The apparatus of claim 11, wherein the target temperature is approximately 200 degrees Fahrenheit.

18. The apparatus of claim 11, wherein the liquid is maintained at a temperature in the range of 180-210 degrees Fahrenheit.

* * * * *

UNITED STATES PATENT AND TRADEMARK OFFICE
CERTIFICATE OF CORRECTION

| | | |
|---|---|---|
| PATENT NO. | : 7,263,283 B2 | Page 1 of 3 |
| APPLICATION NO. | : 10/534195 | |
| DATED | : August 28, 2007 | |
| INVENTOR(S) | : Knepler | |

It is certified that error appears in the above-identified patent and that said Letters Patent is hereby corrected as shown below:

The title page should be deleted to appear as per attached title page.

The sheet of drawings consisting of figures 2 and 3 should be deleted to appear as per attached sheet.

Signed and Sealed this

Twelfth Day of August, 2008

JON W. DUDAS
*Director of the United States Patent and Trademark Office*

(12) United States Patent
Knepler (10) Patent No.: US 7,263,283 B2
(45) Date of Patent: Aug. 28, 2007

(54) ELECTRONIC THERMOSTAT FOR LIQUID HEATING APPARATUS (75) Inventor: John T. Knepler, Springfield, IL (US)

(73) Assignee: Bunn-O-Matic Corporation, Springfield, IL (US)

(*) Notice: Subject to any disclaimer, the term of this patent is extended or adjusted under 35 U.S.C. 154(b) by 0 days.

(21) Appl. No.: 10/534,195

(22) PCT Filed: Nov. 7, 2003

(86) PCT No.: PCT/US03/35583
§ 371 (c)(1),
(2), (4) Date: May 6, 2005

(87) PCT Pub. No.: WO2004/045249
PCT Pub. Date: May 27, 2004

(65) Prior Publication Data
US 2005/0271372 A1 Dec. 8, 2005

Related U.S. Application Data (60) Provisional application No. 60/425,175, filed on Nov. 8, 2002.

(51) Int. Cl.
H05B 1/02 (2006.01)

(52) U.S. Cl. .................... 392/498; 392/318; 392/494

(58) Field of Classification Search .................. 392/498, 392/441–442, 448.14, 497; 398/448.16; 219/482, 488, 491
See application file for complete search history.

(56) References Cited

U.S. PATENT DOCUMENTS

| | | | |
|---|---|---|---|
| 3,581,062 A | 5/1971 | Aston | |
| 3,754,118 A | 8/1973 | Booker | |
| 4,853,519 A | 8/1989 | Tanaka et al. | |
| 4,853,539 A | 8/1989 | Tanaka et al. | |
| 5,392,380 A | 2/1995 | Tsai | |
| 5,589,720 A * | 9/1996 | Tompkins et al. | 700/300 |
| 5,698,849 A * | 12/1997 | DeVilbiss et al. | 219/497 |
| 5,692,096 A | 11/1997 | Massey et al. | |
| 6,130,990 A * | 10/2000 | Herrick et al. | 392/321 |
| 6,351,603 B2 | 2/2002 | Waithe et al. | 392/474 |
| 6,539,173 B2 | 3/2003 | Chu | |
| 6,634,279 B2 * | 10/2003 | D'Antonio et al. | 99/285 |
| 6,806,446 B1 * | 10/2004 | Neale | 219/497 |
| 6,907,680 B2 * | 6/2005 | Mariotti | 34/486 |
| 2003/0000939 A1 * | 1/2003 | Faries et al. | 219/497 |

FOREIGN PATENT DOCUMENTS

EP 648092 A1 * 4/1995

OTHER PUBLICATIONS

International Search Report, date of completion Mar. 17, 2004, for PCT/US2003/035583.

* cited by examiner

Primary Examiner—Philip H. Leung
Assistant Examiner—Vinod Patel
(74) Attorney, Agent, or Firm—Barnes & Thornburg LLP (57) ABSTRACT

An electronic thermostat (20) has a mechanical switch (22) and a solid-state switch (24). The electronic thermostat (20) is suitable for use in a liquid heating apparatus, such as a coffee maker or any other apparatus that dispenses heated beverages. In an illustrative embodiment, the electronic thermostat (20) has a controller (36) and a temperature sensor (34).

18 Claims, 2 Drawing Sheets